(12) United States Patent
Richards et al.

(10) Patent No.: US 10,655,370 B2
(45) Date of Patent: May 19, 2020

(54) METHODS FOR PREVENTING UNINTENDED ACTIVATION OF POWER SLIDE DOOR

(71) Applicant: Toyota Motor Engineering & Manufacturing North America, Inc., Erlanger, KY (US)

(72) Inventors: Frank A. Richards, Michigan Center, MI (US); Tarakorn Soonthornwinate, Ann Arbor, MI (US); Yoshiki Ishikawa, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 366 days.

(21) Appl. No.: 15/676,404

(22) Filed: Aug. 14, 2017

(65) Prior Publication Data

US 2018/0163436 A1 Jun. 14, 2018

Related U.S. Application Data

(60) Provisional application No. 62/431,996, filed on Dec. 9, 2016.

(51) Int. Cl.
*E05B 85/10* (2014.01)
*E05B 77/12* (2014.01)
(Continued)

(52) U.S. Cl.
CPC .............. *E05B 85/10* (2013.01); *E05B 77/04* (2013.01); *E05B 77/06* (2013.01); *E05B 77/12* (2013.01);
(Continued)

(58) Field of Classification Search
CPC ........ E05B 85/10; E05B 85/103; E05B 77/00; E05B 77/02; E05B 77/04; E05B 77/06; E05B 77/26; E05B 77/54; E05B 77/58; E05B 77/12; E05B 79/00; E05B 79/06; E05B 79/10; E05B 79/16; E05B 83/40; E05B 83/103; E05B 2001/0076;
(Continued)

(56) References Cited

U.S. PATENT DOCUMENTS 2,246,708 A 6/1941 Wieben
6,565,134 B1 5/2003 Stuart et al.
(Continued)

*Primary Examiner* — Nathan Cumar
(74) *Attorney, Agent, or Firm* — Christopher G. Darrow; Darrow Mustafa PC

(57) ABSTRACT

Systems and methods are provided for preventing the unintentional operation of a flush mounted handle assembly for a power slide door of a vehicle. A dual-directional handle base may be provided, pivotally coupled to a case fixed in a recess of a power slide door of a vehicle. The handle base may have a first end and a second opposing end. The first and seconds ends may be configured for a selective pivotal movement in opposite directions about a pivot axis. A bell crank may be provided, coupled to the case, and configured to rotate upon engagement with the handle base in order to actuate a switch assembly sending a signal to an ECU. Methods may include determining, at the ECU, that the signal was not transmitted as a result of a vehicle impact. After such determination, the method includes activating operation of the power slide door.

20 Claims, 14 Drawing Sheets

(51) Int. Cl.
| | |
|---|---|
| *E05B 81/76* | (2014.01) |
| *E05F 15/79* | (2015.01) |
| *E05B 77/04* | (2014.01) |
| *E05B 83/40* | (2014.01) |
| *E05B 79/06* | (2014.01) |
| *E05B 79/16* | (2014.01) |
| *E05B 77/06* | (2014.01) |
| *E05B 1/00* | (2006.01) |
| *B60J 5/06* | (2006.01) |

(52) U.S. Cl.
CPC .............. *E05B 79/06* (2013.01); *E05B 79/16* (2013.01); *E05B 81/76* (2013.01); *E05B 83/40* (2013.01); *E05B 85/103* (2013.01); *E05F 15/79* (2015.01); *B60J 5/06* (2013.01); *E05B 2001/0076* (2013.01); *Y10S 292/31* (2013.01)

(58) Field of Classification Search
CPC .... E05F 15/79; E05F 15/77; B60J 5/06; B60J 5/062; B60R 21/0134; B60R 21/0027; B60R 2021/0132; Y10S 292/31
USPC ........................................ 292/336.3
See application file for complete search history.

(56) References Cited

U.S. PATENT DOCUMENTS

| | | | |
|---|---|---|---|
| 7,320,478 B2 | 1/2008 | Gaboury et al. | |
| 7,621,573 B2* | 11/2009 | Thomas | E05B 81/76 292/336.3 |
| 8,322,077 B2* | 12/2012 | Papanikolaou | E05B 77/06 292/336.3 |
| 8,701,353 B2 | 4/2014 | Patel et al. | |
| 8,873,742 B1 | 10/2014 | Owens et al. | |
| 9,151,089 B2 | 10/2015 | Aerts et al. | |
| 9,181,733 B2 | 11/2015 | Fujiwara et al. | |
| 9,249,608 B2 | 2/2016 | Lang et al. | |
| 9,505,365 B1 | 11/2016 | Van Wiemeersch | |
| 2007/0199760 A1* | 8/2007 | Kamiya | B60R 21/013 180/286 |
| 2010/0088855 A1 | 4/2010 | Ruse et al. | |
| 2011/0120022 A1* | 5/2011 | Papanikolaou | E05B 77/06 49/460 |
| 2011/0179602 A1 | 7/2011 | Fujiwara et al. | |
| 2011/0258935 A1 | 10/2011 | Heller | |
| 2012/0181800 A1 | 7/2012 | Jankowski et al. | |
| 2013/0241215 A1 | 9/2013 | Halliwell et al. | |
| 2014/0015261 A1 | 1/2014 | Burns et al. | |
| 2014/0049058 A1 | 2/2014 | Kudoh et al. | |
| 2014/0265372 A1 | 9/2014 | Smart | |
| 2014/0327252 A1 | 11/2014 | Sobecki et al. | |
| 2015/0035299 A1 | 2/2015 | Corwin et al. | |
| 2015/0076843 A1 | 3/2015 | Kindig | |
| 2015/0233153 A1 | 8/2015 | Smart et al. | |
| 2015/0233154 A1 | 8/2015 | Smart et al. | |
| 2015/0283886 A1 | 10/2015 | Nania | |
| 2016/0163133 A1 | 6/2016 | Ricci | |
| 2016/0290019 A1 | 10/2016 | Nagata et al. | |
| 2017/0041816 A1 | 2/2017 | Cho et al. | |

\* cited by examiner

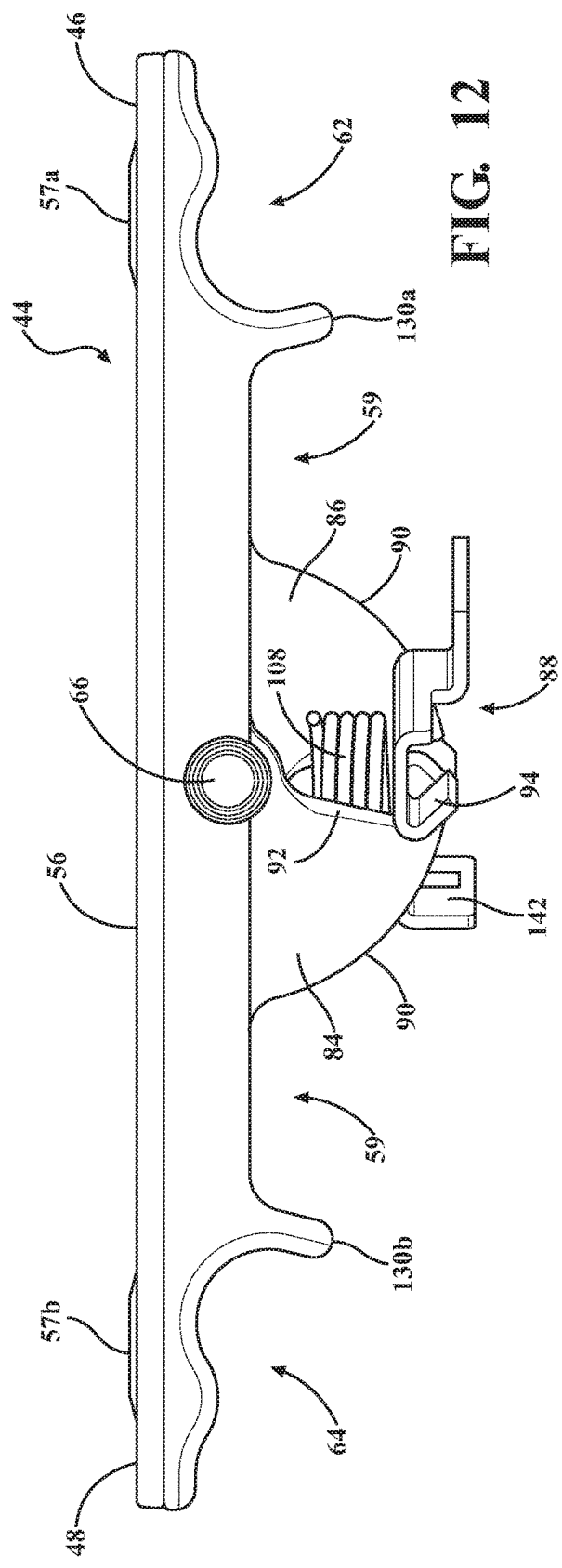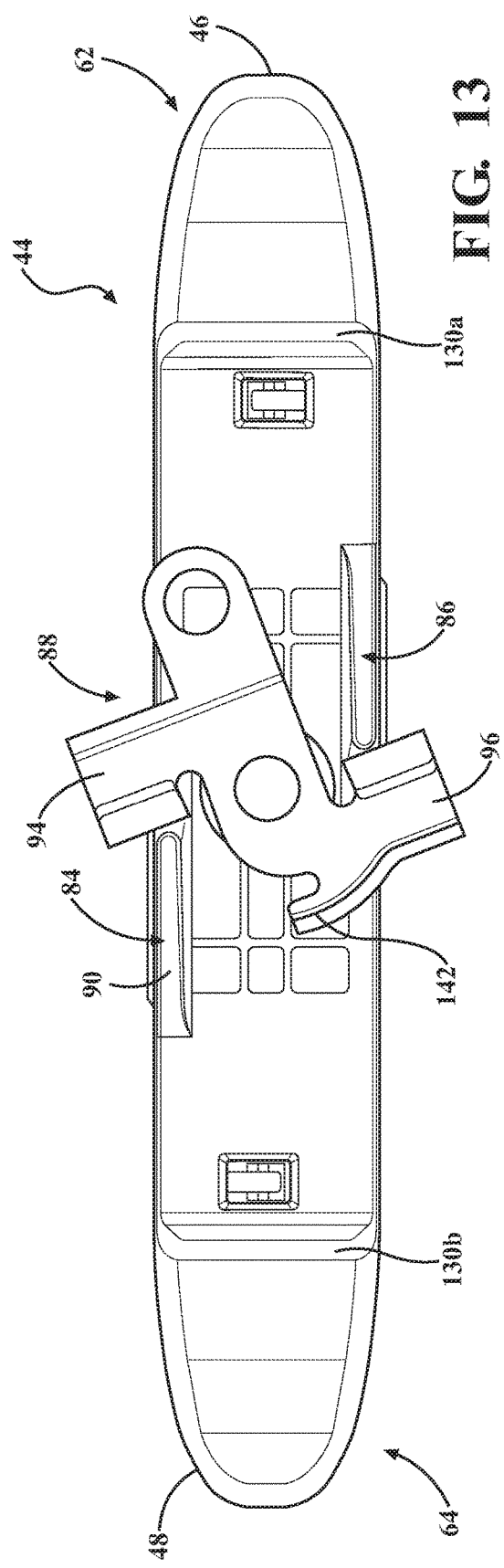

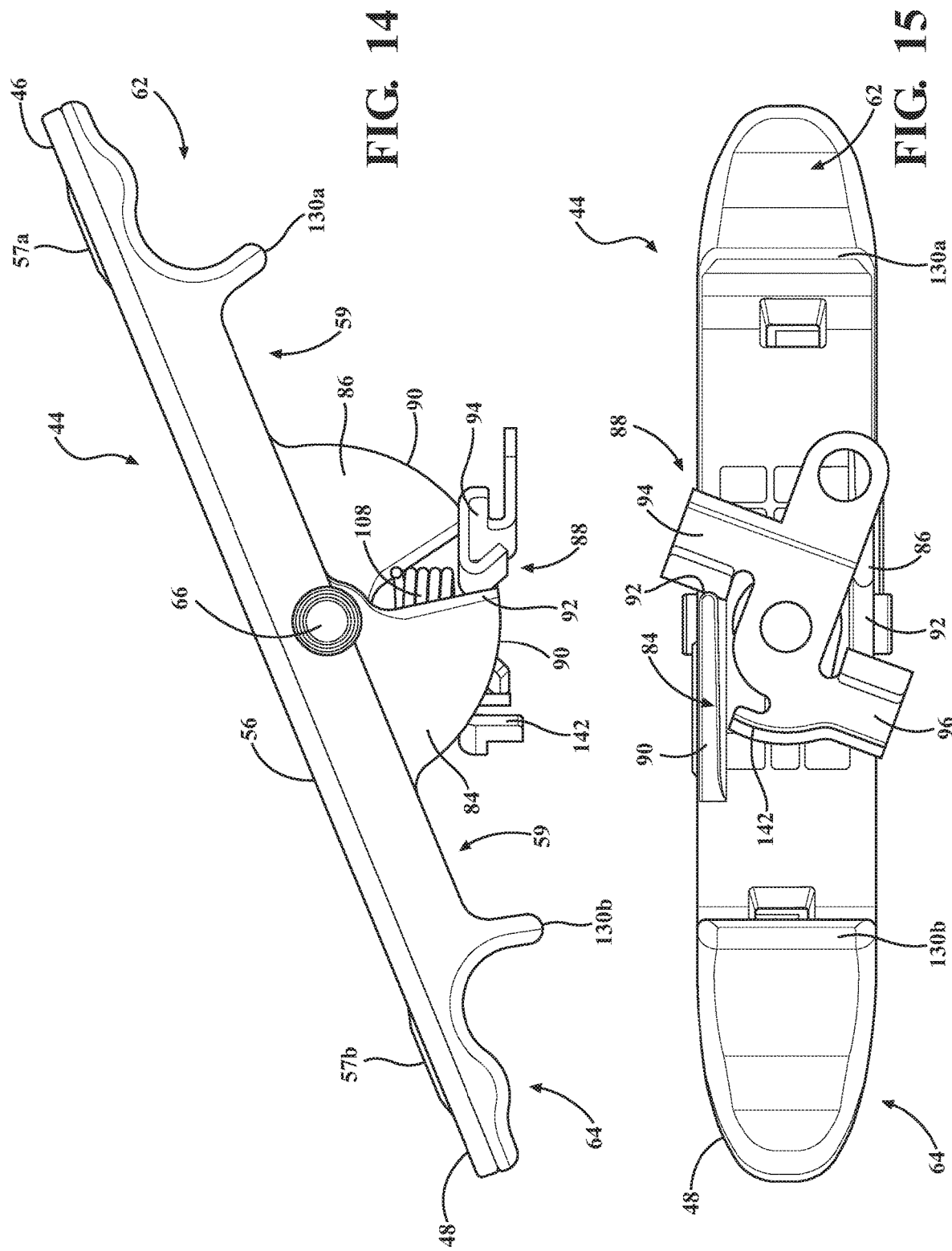

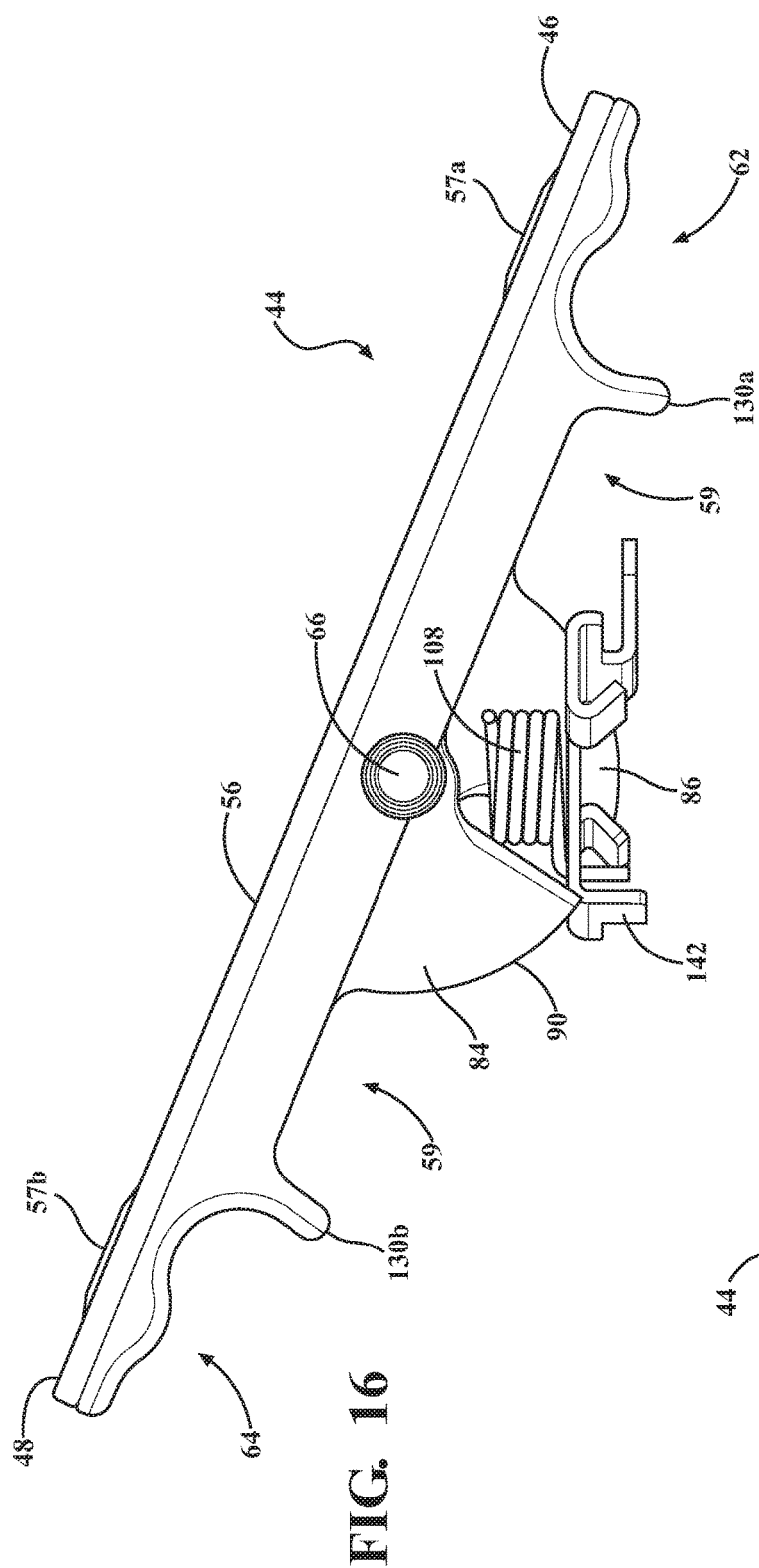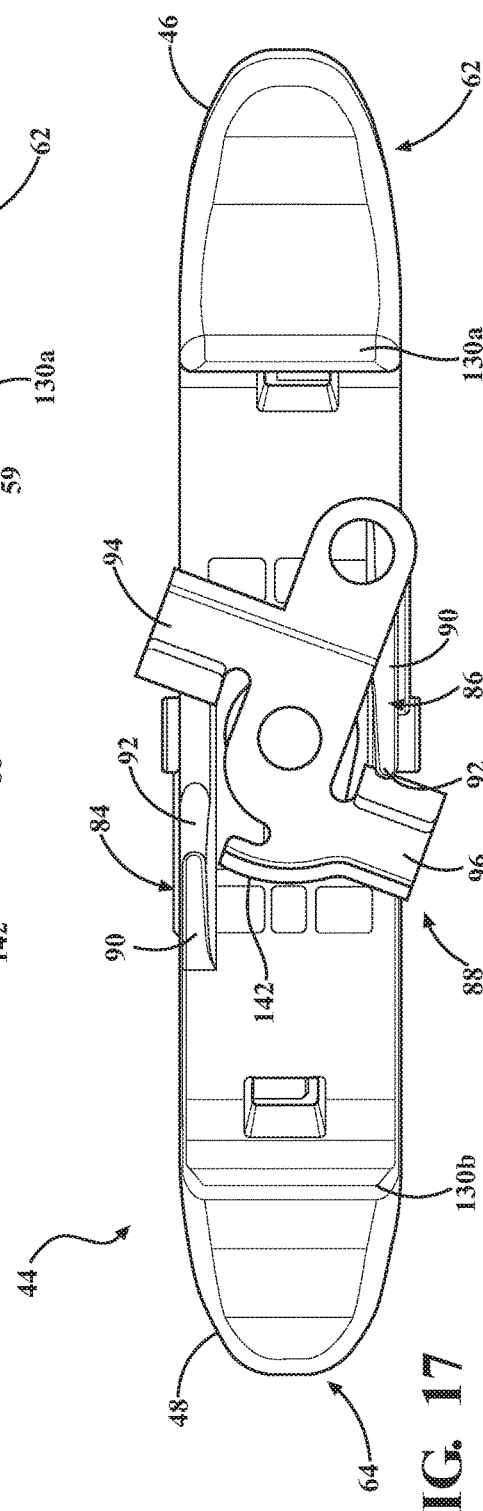

METHODS FOR PREVENTING UNINTENDED ACTIVATION OF POWER SLIDE DOOR

CROSS-REFERENCE TO RELATED APPLICATION

This application claims the benefit of U.S. Provisional Application No. 62/431,996, filed Dec. 9, 2016, which is incorporated by reference in its entirety.

TECHNICAL FIELD

The present disclosure relates generally to preventing unintentional operations of a one-touch or push button flush handle for a vehicle door and, more particularly, to restricting unintended operations triggered from a door handle pivoting during a vehicle impact or equivalent.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Minivan-type vehicles commonly have a pair of pivoting front occupant doors and at least one rear occupant sliding door. In various instances, users may approach a vehicle with their hands occupied, for example, carrying groceries or carrying a young child. Manual "grip" type handles commonly used with most vehicles are not necessarily operable without a relatively strong grip and pull, which may be difficult if one's hands are not otherwise free. Thus, it would be desirable to have a door handle that is easy to operate with a gentle push or depression of one or two fingers. However, the automatic opening and closing of a vehicle door may need additional safety features.

Various safety designs and considerations may take into account an assumption that vehicle doors are typically closed during a collision or impact. Thus, if the sliding door on a vehicle is unlatched or opened during a side impact, energy may not be as effectively dissipated as desired through the vehicle's body and frame, and overall crash worthiness may be reduced. In this regard, if a vehicle is involved in a collision or impact, it may not be safe to open the door, which may result to damage to the door or other parts of the vehicle. Accordingly, there remains a need for an improved safety considerations to minimize the ability of a handle assembly to cause a door to open during an impact event, after an impact event, or in other emergency situations or other similar instances when a powered door should not be available for use.

SUMMARY

This section provides a general summary of the disclosure, and is not a comprehensive disclosure of its full scope or all of its features.

In various aspects, the present disclosure provides a method for operating a flush mounted handle assembly for a power slide door of a vehicle. The method may include permitting a first end of a pivoting handle to be depressed inward a first distance into the handle assembly, thereby causing a drive arm extending from the handle to rotate a bell crank. Upon rotation of the bell crank, the method may include actuating a switch sub-assembly configured to transmit a signal to request an opening or closing operation of the power slide door. The signal may be received at a controller, such as an electronic control unit (ECU). The method may include determining, at the ECU, that the signal was not transmitted as a result of a vehicle impact. After such determination, the method includes activating operation of the power slide door. In various aspects, the determination that the signal was not transmitted as a result of a vehicle impact includes verifying that no airbag has been deployed for a predetermined time after the ECU receives the signal.

In other aspects, the present disclosure provides a method for preventing an unintended activation of a single touch, flush mounted handle assembly for a power slide door of a vehicle. The method may include providing a flush mounted handle assembly with a handle base pivotally coupled to a case fixed in a recess of the power slide door. The method may include permitting a first end of the pivotally coupled handle base to be depressed inward a first distance into the handle assembly, thereby causing a drive arm extending from the handle to rotate a bell crank. Upon rotation of the bell crank, the method includes actuating a switch sub-assembly configured to transmit a signal to request an opening or closing operation of the power slide door. The signal may be received at an electronic control unit (ECU). Once received, the ECU determines that the signal was not transmitted as a result of a vehicle impact. The method then proceeds with activating operation of the power side door after a predetermined period of time has elapsed without the ECU receiving any indication that a vehicle airbag has been deployed. In various aspects, the predetermined time period may be greater than about 0.8 seconds.

In still other aspects, the present disclosure provides a system for preventing an unintended activation of a single touch, flush mounted handle assembly for a power slide door of a vehicle. The system includes a flush mounted handle assembly. The handle assembly includes a case configured to be fixed in a recess of the power slide door of the vehicle. A handle base is provided, pivotally coupled to the case. The handle base has a first end and a second opposing end, with the first and seconds ends being configured for a selective pivotal movement in opposite directions about a fixed pivot axis with respect to a resting plane. The handle assembly includes a bell crank coupled to the case and configured to rotate upon engagement with the handle base in order to actuate a switch assembly and to transmit a signal to initiate powered operation the power slide door. At least one airbag and/or crash sensor (or the like) is provided, configured to detect a collision and/or the deployment of an airbag. An electronic control unit (ECU) is provided, programmed to receive the signal transmitted by the switch assembly and control operations of the power slide door. The ECU is further being programmed to determine that the signal was not transmitted as a result of a vehicle impact prior to operating the power slide door.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the following description and the accompanying drawings, wherein:

FIG. 12 is a top plan view illustrating an exemplary handle base and bell crank in a centered resting, or neutral state;

FIG. 13 is a rear plan view illustrating the exemplary handle base and bell crank in the centered resting, or neutral state, as shown in FIG. 12;

FIG. 14 is a top plan view illustrating an exemplary handle base and bell crank in a first, fully depressed, actuated state;

FIG. 15 is a rear plan view illustrating the exemplary handle base and bell crank in the first, fully depressed, actuated state, as shown in FIG. 14;

FIG. 16 is a top plan view illustrating an exemplary handle base and bell crank in a second, fully depressed, actuated state;

FIG. 17 is a rear plan view illustrating the exemplary handle base and bell crank in the second, fully depressed, actuated state, as shown in FIG. 16.

Figure 1:
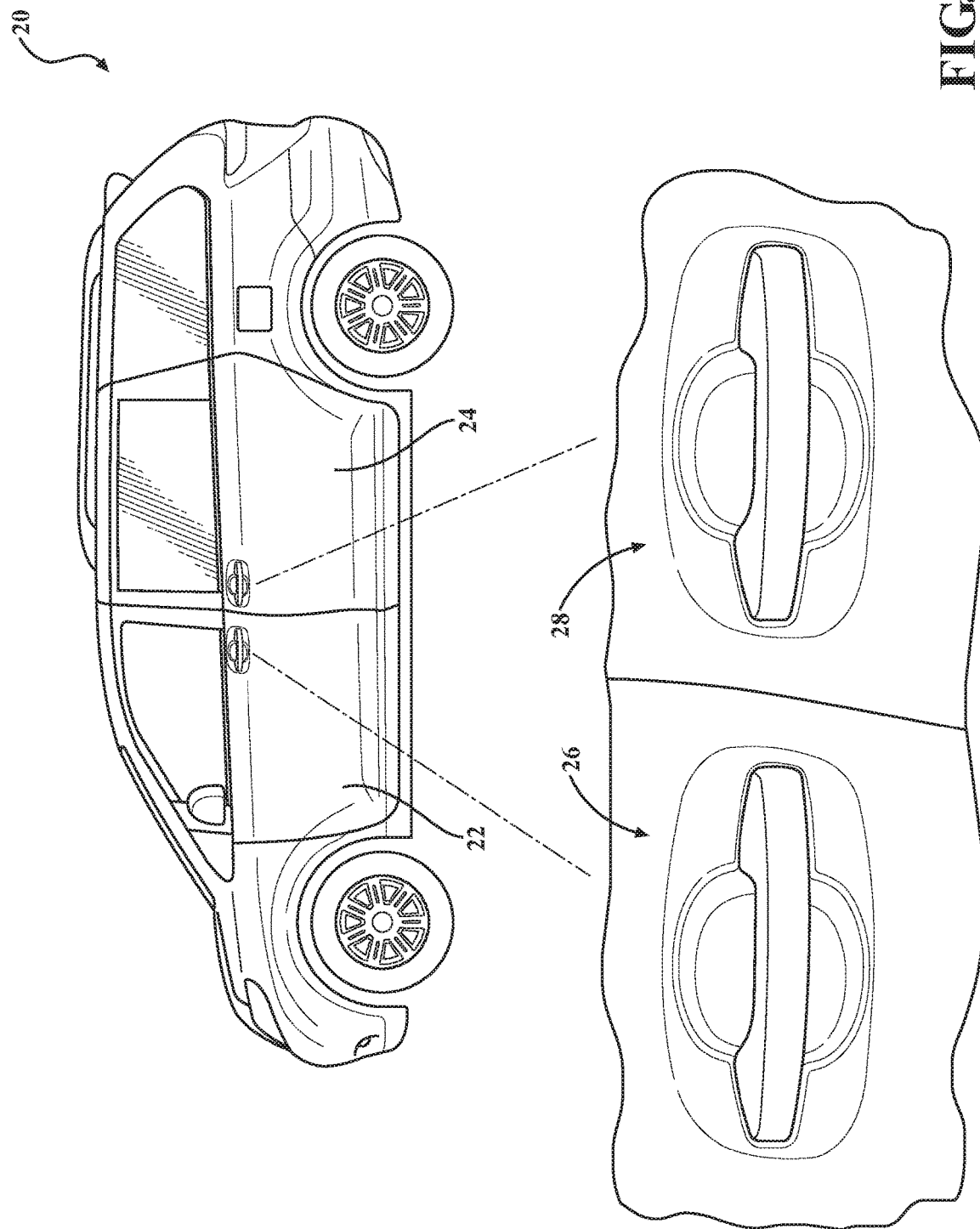
FIG. 1 is a side plan view of a mini-van styled vehicle having a prior art grip type door handle for both a front pivoting door and a rear slide door.

It should be noted that the figures set forth herein are intended to exemplify the general characteristics of the devices and methods among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present technology generally relates to systems and methods focused on safety considerations for the operation of a power slide door flush-mounted handle assembly. In particular aspects, the handle assembly is provided with an exterior surface that is substantially flush with an outside panel or exterior surface of a power slide door. The handle assembly is preferably operated in a powered mode, yet it maintains a manual open/close operation of the slide door when necessary. For example, the power slide door is intended to be primarily operated in a powered mode with a one-touch, or push button actuation to trigger operation of the door. In particular, the door is actuated by slightly depressing one of two opposing ends of a pivoting handle to actuate an internal switch that, in turn, coordinates a powered open/close slide door function. Notably, in case of an emergency or loss of vehicle power, however, this handle assembly design additionally maintains a manual operation mode. To operate the manual mode, a user further depresses the one of two opposing ends an additional distance that releases a locking mechanism, exposes the other of the two ends of the pivoting handle to provide a grip, and enables a manual mode of operation to open/close the slide door using the grip.

With a one-touch, or push button type actuation, certain safety considerations should be considered to ensure that the actuation is intentional. For example, if a vehicle is involved in a collision, or is struck by a barrier or other object, the one-touch actuation mechanism may be inadvertently triggered. Accordingly, the present technology is concerned with providing safety mechanisms to prevent, or at least minimize, such unwanted or unintentional activation of the power slide door. As will be discussed in more detail below, various methods of the present technology relating to such activation include permitting a first end of a pivoting handle to be depressed inward a first distance into the handle assembly, thereby causing a drive arm extending from the handle to rotate a bell crank. Upon rotation of the bell crank, the methods may include actuating a switch sub-assembly configured to transmit a signal to request an opening or closing operation of the power slide door. This signal is thereafter received at one or more control systems of the vehicle, such as an electronic control unit ("ECU"), or equivalent. The methods of the present technology include determining that the signal was not transmitted as a result of a vehicle impact, or the like. Preferably, only after such determination, the methods include triggering operation of the power slide door. The determination that the signal was not transmitted as a result of a vehicle impact, or the like, may include checking the status of various airbag and/or crash sensors, and may include repeated or continuous verifying that no airbag has been deployed for a predetermined time after the ECU receives the signal.

To better understand the systems and methods of the present technology, it is beneficial to understand the various mechanical features of the flush-mounted handle assemblies contemplated to be used with the present technology. A detailed discussion of the methods of the present technology follows after the description of FIGS. 1-17.

FIG. 1 is a side plan view of a mini-van styled vehicle 20 with a pivoting front door 22 and a sliding rear door 24, with each door having a prior art grip-type door handle 26, 28.

Figure 2:
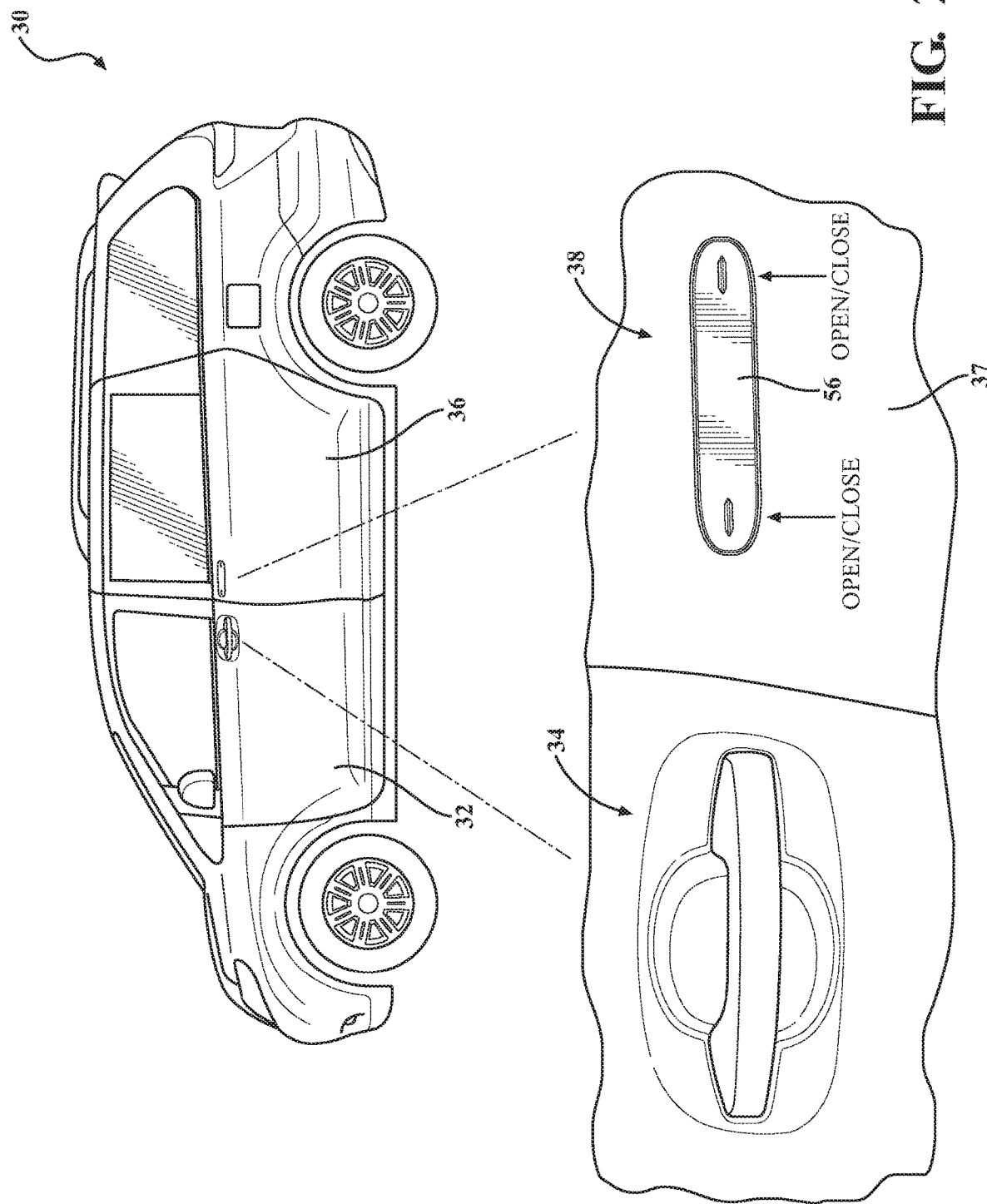
FIG. 2 is a side plan view of a mini-van styled vehicle having a flush mounted type door handle for operating the rear slide door according to the present teachings.

FIG. 2 is a side plan view of a mini-van styled vehicle 30 with a pivoting front door 32 having a similar grip type door handle 34, and a sliding rear door 36 having a flush mounted type door handle 38 according to the present teachings. The present design provides appealing aesthetics and eliminates the manual "grip" type handle extending from the typical sliding vehicle door when the handle is not in use. In particular, the door handle assembly is mounted inside of a case, or housing, that is attached to and integrated within the power slide door ("PSD") body.

Figure 3:
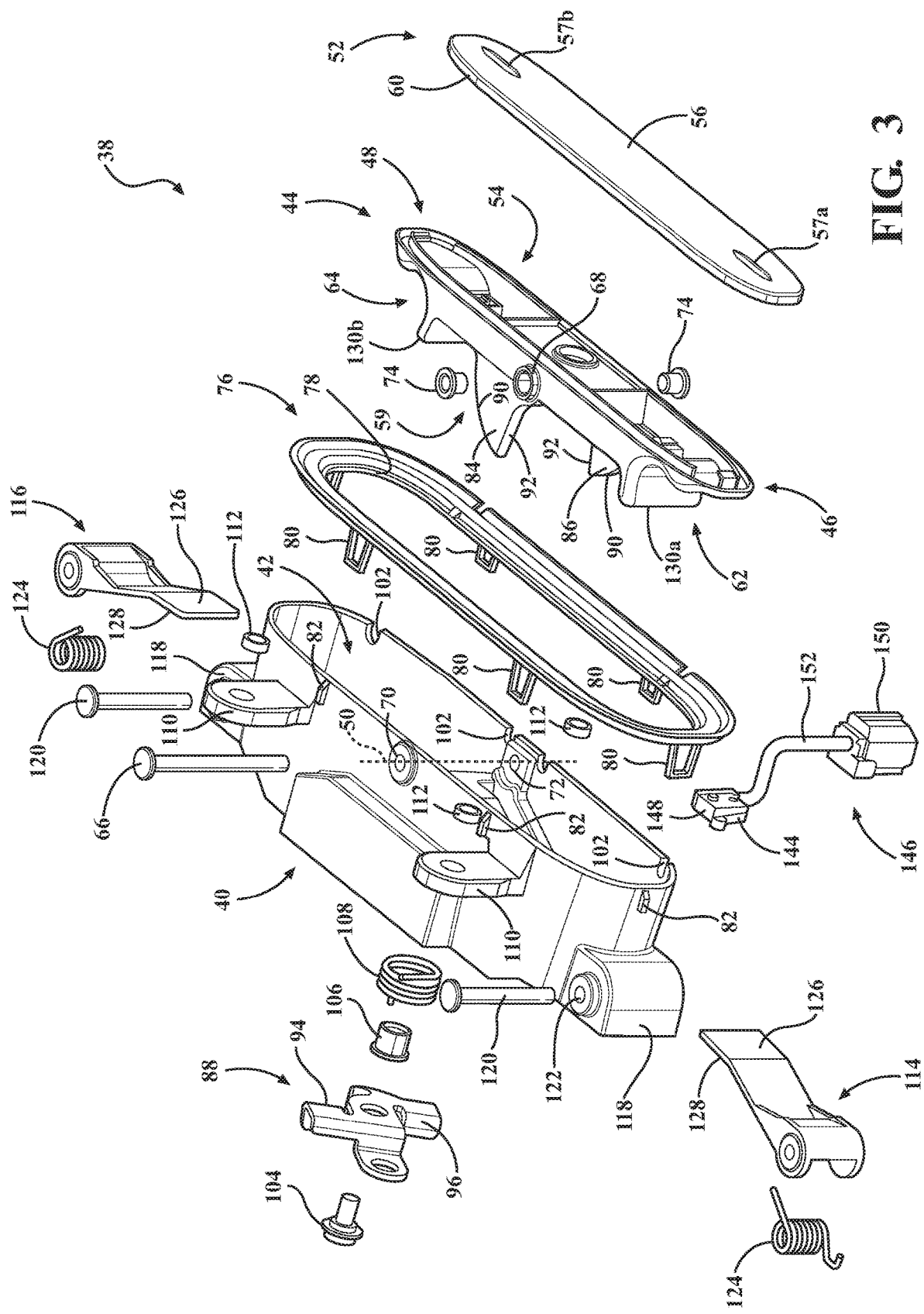
FIG. 3 is an exploded perspective view illustrating various details of the flush mounted handle system according to the present disclosure.

FIG. 3 is an exploded perspective view illustrating various details of the flush mounted handle assembly 38 according to the present disclosure. In various aspects, a case 40 is provided, configured to be attached to or fixed with a power slide door 36, for example, disposed in a recess of an exterior panel 37 of the slide door 36. The case 40 may define an internal cavity 42 having a size and shape configured to house various components of the handle assembly 38. A handle base 44 is provided with first and second opposing ends 46, 48. The handle base 44 may be pivotally coupled to the case 40 for pivotal, or see-saw, movement of the handle base 44 at a fixed pivot axis 50 with respect to the case 40.

Figure 8:
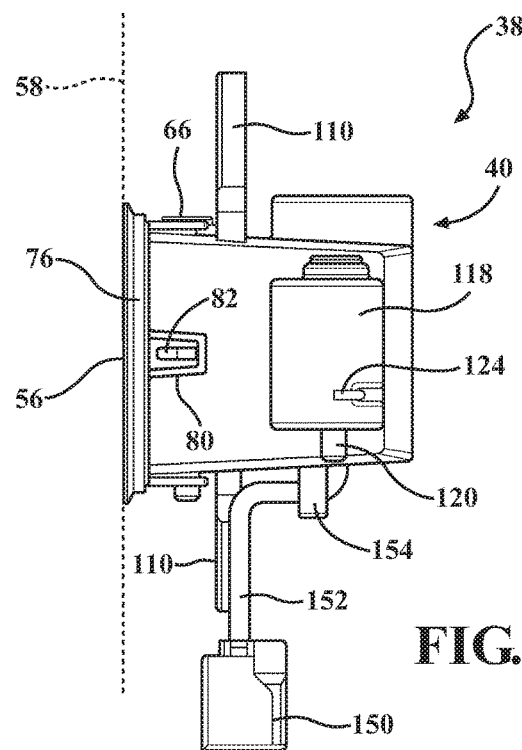
FIG. 8 is a side plan view illustrating the assembled flush mounted handle as shown in FIG. 3.

The handle base 44 may be hollow and may include a cover plate 52, or the like, to define a front face (i.e., exterior facing side) 54 that may be substantially planar, located in a front plane 58, or otherwise referred to as a resting plane, as shown in FIG. 8. The cover plate 52 may define an oval shaped perimeter 60. As shown, the cover plate 52 may be provided as a separate component, coupled to the front face 54 of the handle base 44 and configured to define an exterior surface 56. In other aspects, the cover may be integrally formed with the handle base 44. The cover 52 may include one or more surface features 57a, 57b that indicate where the handle should be pressed for actuation. The surface features 57a, 57b may be extensions or recesses, and may be unique or different from one another to indicate a functionality of operation. A rear face (i.e., internal facing side) 59 of the handle base 44 may be shaped or contoured. For example, the respective grip areas 62, 64 near the first and second opposing ends 46, 48, may be provided with a curved or scalloped portion that can be configured for use as a gripping surface to grab and move the power slide door in a manual power mode, as will be discussed in more detail below. In various aspects, in an assembled state and in a rest position, the exterior surface 56 of the handle assembly 38, which in most instances is the cover 52, may be substantially aligned with, or flush with, an exterior surface 37, or panel, of the power slide door 36.

In the non-limiting example shown, an axle pin 66, or similar fastener, may be provided through a bore 68 defined in a center region of the handle base 44. As shown, the axle pin 66 is placed through respective upper and lower apertures 70, 72 located in a center area (along the length direction) of the case 40. Appropriate bushings 74 may be also provided. A seal or pad 76 may be provided, for attachment to the case 40. The seal 76 may define an inner diameter 78 commensurate with a shape of the handle base 44 and cover 52. As shown, a plurality of cooperating retention features 80 and angled protrusions/ribs 82 may be disposed about a perimeter of the pad 76 and the case 40.

The handle base 44 may define first and second drive arms 84, 86 to actuate rotational movement of a bell crank 88. As shown, the drive arms 84, 86 may be independent from one another and, in one example, may extend a distance from the rear face 59 of the handle base 44 in a direction perpendicular to the front plane 58. As shown each drive arm 84, 86 may define an arcuate shaped portion 90 and a substantially linear shaped portion 92 that can be used to engage respective arms 94, 96 of the bell crank 88. A rear wall 98 of the case 40 may be provided with respective apertures 100 (FIG. 9) defined therein through which the drive arms 84, 86 pass through to engage the bell crank 88. The case 40 may also be provided with a plurality of spaced-apart drain holes 102 to allow water or liquids to pass through the handle assembly. The case 40 may include various attachment flanges 110 for securing the case 40 to the power slide door 36 with fasteners and collars 112.

The bell crank 88 may be coupled to an exterior of the case 40, for example, using a bolt 104 and weld nut 106, or other suitable fastening mechanism, at the center of the rear wall 98. A biasing member 108 may be provided, such as a spring, located between the case 40 and the bell crank 88 in order to urge rotation of the bell crank 88 in a self-centering rest position. In the exemplary bell crank 88 shown, two lever arms 94, 96 are provided having an angle of separation of about 180 degrees.

In various aspects, the assembly 38 may be provided with a pair of paddles 114, 116 weighted or otherwise configured to bias the handle base 44 in a self-centering, rest position. For example, the paddles 114, 116 can be provided as counterweights with enough inertia to prevent unwanted movement of the handle base 44, which may be especially useful when the handle assembly 38 is subjected to certain forces, such as the forces involved during a vehicle side-impact collision or the like. As shown, the case 40 may be provided with opposed, extending side portions 118 to house the paddles 114, 116 and provide each paddle with a separate, independent pivot axis 115 (shown in FIG. 11). Paddle axle pins 120 may be aligned with respective apertures 122 defined in the extending side portions 118 to secure the paddles 114, 116 and provide for rotational movement. In an assembled state, the paddle axle pins 120 may be located adjacent to respective opposing side portions 118 of the case 40, with the fixed pivot axis 50 for the handle base 44 located substantially centered, or between the paddle axle pins 120. Biasing members, such as springs 124 may be provided to urge the weighted paddles 114, 116 against respective portions of the rear face 59 of the handle base 44, as will be discussed in more detail below. For example, forward facing engagement surfaces 126 of the paddles 114, 116 may contact extending end portions 130a, 130b of the handle base 44, urging the handle toward a centered, or rest position.

With renewed reference to FIG. 2, when it is desired to activate the power slide door 36, a user simply needs to inwardly press the respective end 46, 48 of the handle, as identified by the arrows labeled "Open/Close," a first distance. As will be discussed in more detail below, the inward depression of the end 46, 48 of the handle 44 a first depressed position will cause one of the drive arms 84, 86 of the handle base 44 to engage a respective arm 94, 96 of the bell crank 88. The bell crank 88 will rotate in a first direction which, in turn, provides for the actuation of a switch sub-assembly 146 that engages operation of a motor (not shown) to activate the power slide door 36 and slidably move the door into the desired open or closed position. In various aspects, once the handle is inwardly pushed to the appropriate first distance, to the first depressed position, the handle assembly 38 may be configured to provide at least one of an audible or visual notification to a user, such as a tone or beep/sound, in order to indicate to the user when the power slide door has been activated. In certain aspects, there may be a visual indication, such as an LED light or the like, notifying the user of the activation. Additionally or alternatively, the handle assembly 38 may be provided with the ability to provide haptic feedback. In still other aspects, the user may additionally feel an increased level of push-back or resistance from the spring 124.

Once a user releases the end 46, 48 of the door handle, whether it is the handle base 44 or the cover 52 attached thereto, the handle base 44 may then be automatically biased back to a centered, or rest position. For example, the biasing member 108 urges the rotation of the bell crank 88 in a direction opposite that of the rotation previously caused by the engagement with the drive arm 84, 86. At the same time, one or more biasing member 124 coupled with the respective side paddle 114, 116 urges the paddle 114, 116 back a rest position, which, in turn, moves the handle base 44 to a centered, rest position where the exterior surface 56 of the handle assembly 38 is substantially flush with an exterior surface 37 of the power slide door 36.

Figure 4A:
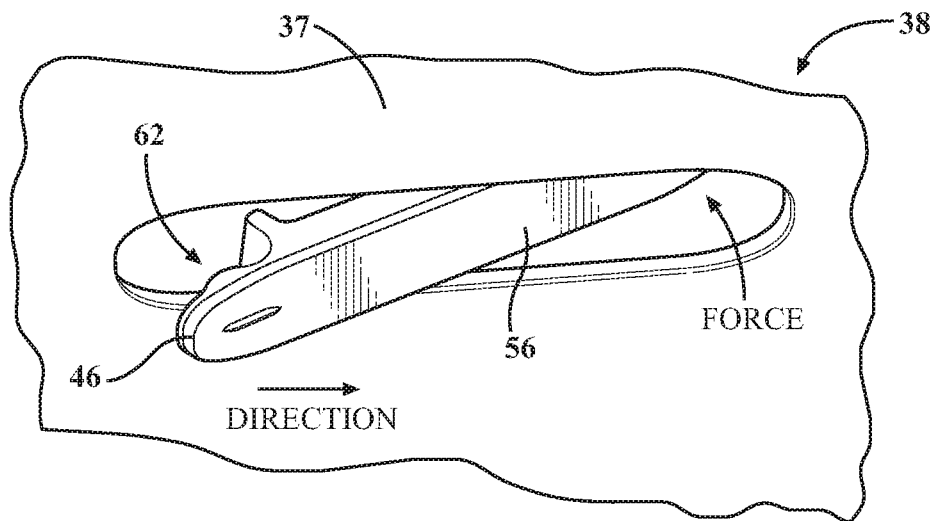
FIG. 4A is a first schematic view illustrating the operation of the flush mounted door handle according to a first aspect with a pivoting grab bar handle.
Figure 4B:
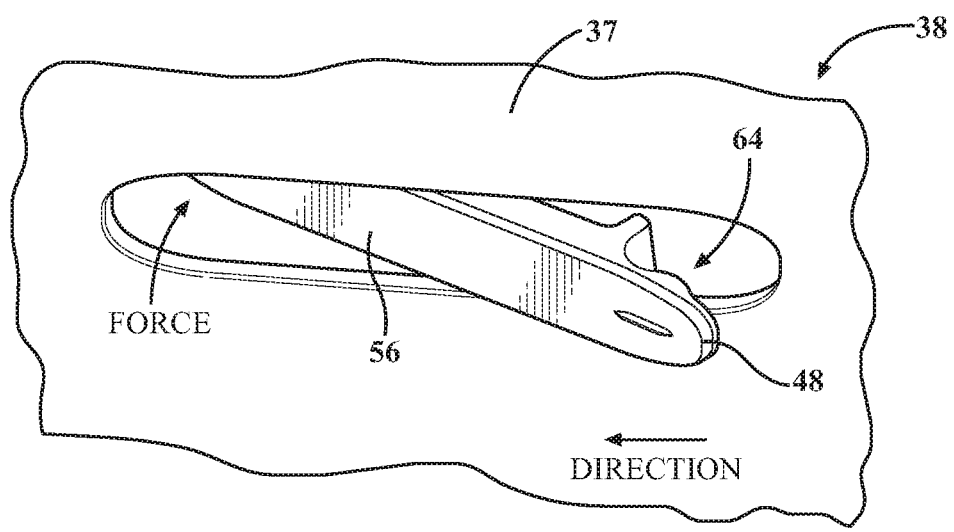
FIG. 4B is a second schematic view illustrating the operation of the flush mounted door handle according to the first aspect with a pivoting grab bar handle.

One of the many features of the present technology is that the handle assembly is also configured to provide a manual mode of operation, for example, when the power source is depleted or not available, or in certain emergency modes when it may not be feasible or desirable to operate in a power mode. FIGS. 4A and 4B are schematic views illustrating the operation of the flush mounted door handle assembly 38 in the manual operation mode with a pivoting grab bar handle base 44. In order to operate the handle assembly 38 in a manual mode, a user will first similarly engage a respective end 46, 48 of the door handle 44, or cover 52. However, instead of lightly depressing the desired end 46, 48 (selected based on the desired directional movement) of the handle base 44, the end 46, 48 is depressed to a second depressed position, which is inward a further distance than the first position. For example, in various aspects, lightly depressing the handle for operation of the powered mode may include a depression movement of the handle end 46, 48 an inward distance of from about 3 mm to about 10 mm, or about 7 mm. Depressing the handle for operation of the manual mode may include a depression movement of the handle end 46, 48 a distance of from about 18 mm to about 21 mm, or more. Further depressing the handle end 46, 48 this distance will serve to release a locking mechanism, for example, to pull a cable 89 (FIG. 11) or other mechanical coupling that may be configured as a release mechanism, in order to unlock/unlatch the slide door and to operate the slide door in a manual operational mode.

As shown in FIG. 4A, the depression of the right end 48 pivots the handle base 44 and thus the left end 46 is pivoted in an outward extended position. In this extended position, the left end exposes a rear gripping area 62 for a user to grab and pull the door in the right direction, thus opening the door. Once a user releases the gripping area 62 of the door handle, the handle base 44 may then be automatically biased back to a centered, or rest position, as described above. As shown in FIG. 4B, the depression of the left end 46 pivots the handle base 44 and thus the right end 48 is pivoted in an outward extended position. In this extended position, the right end exposes a rear gripping area 64 for a user to grab and pull the door in the left direction, thus closing the door. Again, once a user releases the gripping area 64 of the door handle, the handle base 44 may then be automatically biased back to a centered, or rest position, as described above.

Figure 5A:
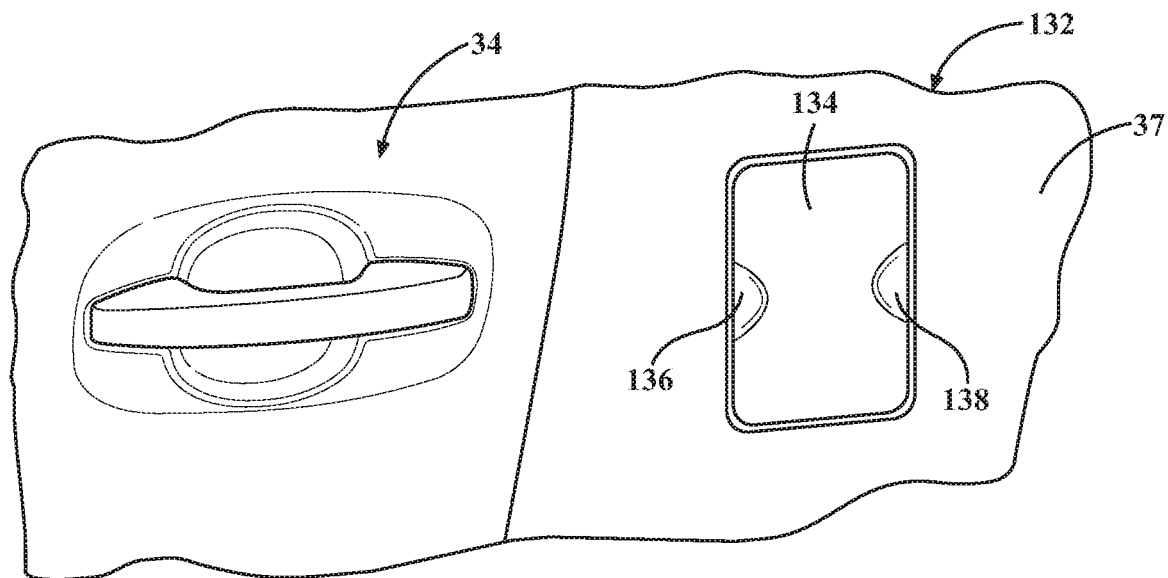
FIG. 5A is a first schematic view illustrating the operation of the flush mounted door handle according to a second aspect with a pivoting plate handle.
Figure 5B:
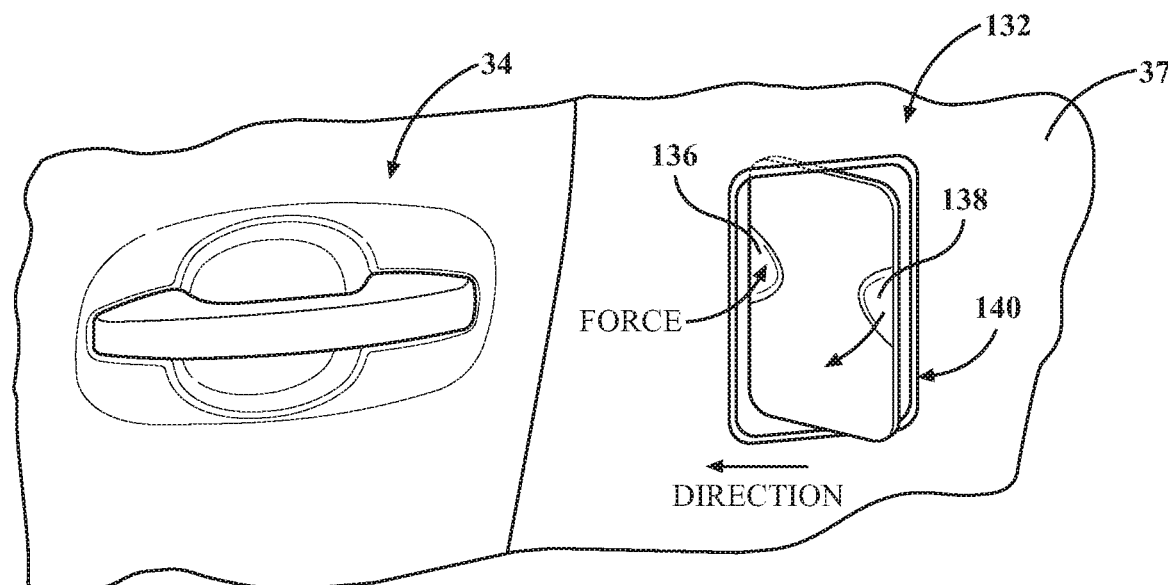
FIG. 5B is a second schematic view illustrating the operation of the flush mounted door handle according to the second aspect with a pivoting plate handle.

FIGS. 5A and 5B are schematic views illustrating the operation of a plate-type flush mounted door handle assembly 132 in a power mode (FIG. 5A) and a manual mode (FIG. 5B) using a pivoting plate handle base 134 according to another aspect of the present technology. The plate handle base 134 rotates about a central pivot axis, similar to the other design. As shown, it is contemplated that the flush handle design can be operated by a single press of a finger, as opposed to having to use one's hand in order to grip and pull open a handle according to the traditional handle designs used in the prior art. No gripping would be required to operate the slide door in the powered mode. As shown in FIG. 5A, the plate base 134 similarly has first and second opposing ends 136, 138 that are similarly configured to be depressed to a first depressed position in order to actuate an automated movement of the power slide door 36 in a power mode. In one non-limiting example, the plate 134 may be provided with similar drive arms, as discussed above, to engage the bell crank 88. As shown in FIG. 5B, when a manual mode is desired, a user may depress a desired end, here the left end 136, to a second depressed position in order to release a locking mechanism, such as a cable 89 (FIG. 11), and expose a rear gripping area 140 for a user to grab and pull the door in the left direction, thus closing the door. Although not shown, opening the door in a manual mode is similarly accomplished by depressing the right end 138, to a second depressed position, exposing an opposite rear gripping end for a user to grab and pull the door in the right direction, thus opening the door.

Figure 6:
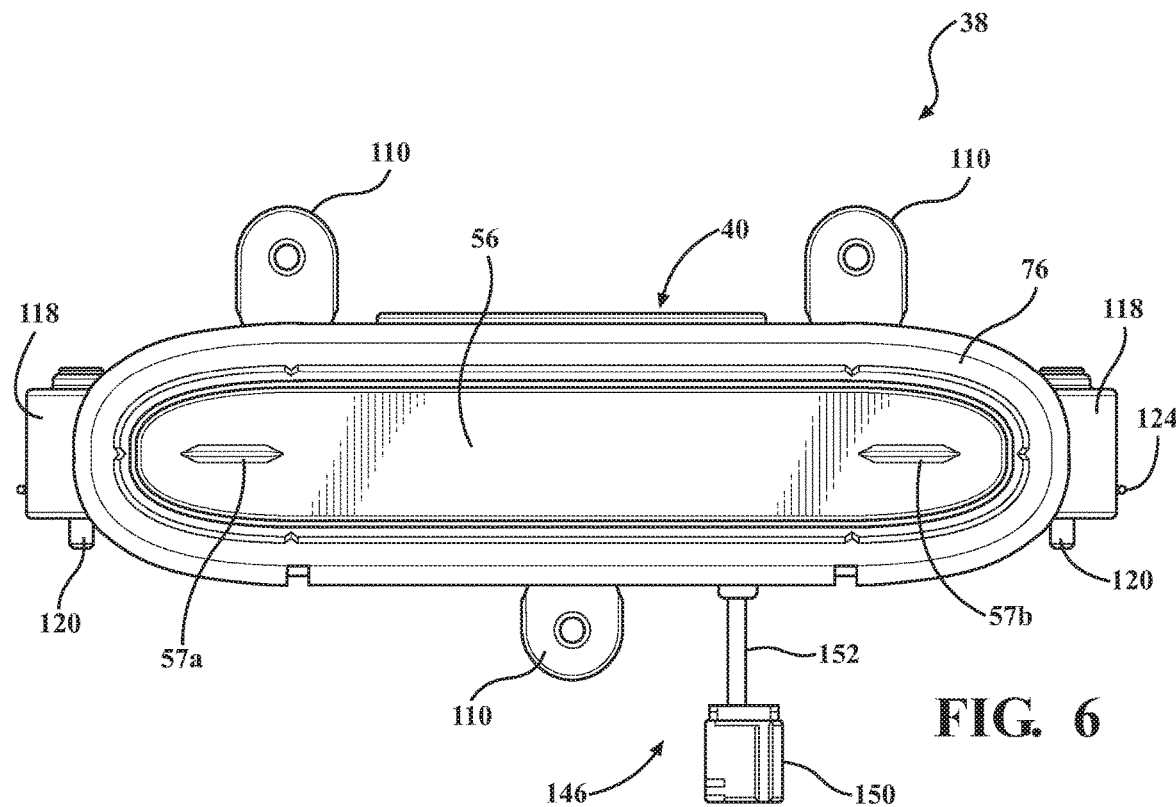
FIG. 6 is a front plan view illustrating the assembled flush mounted handle as shown in FIG. 3.
Figure 7:
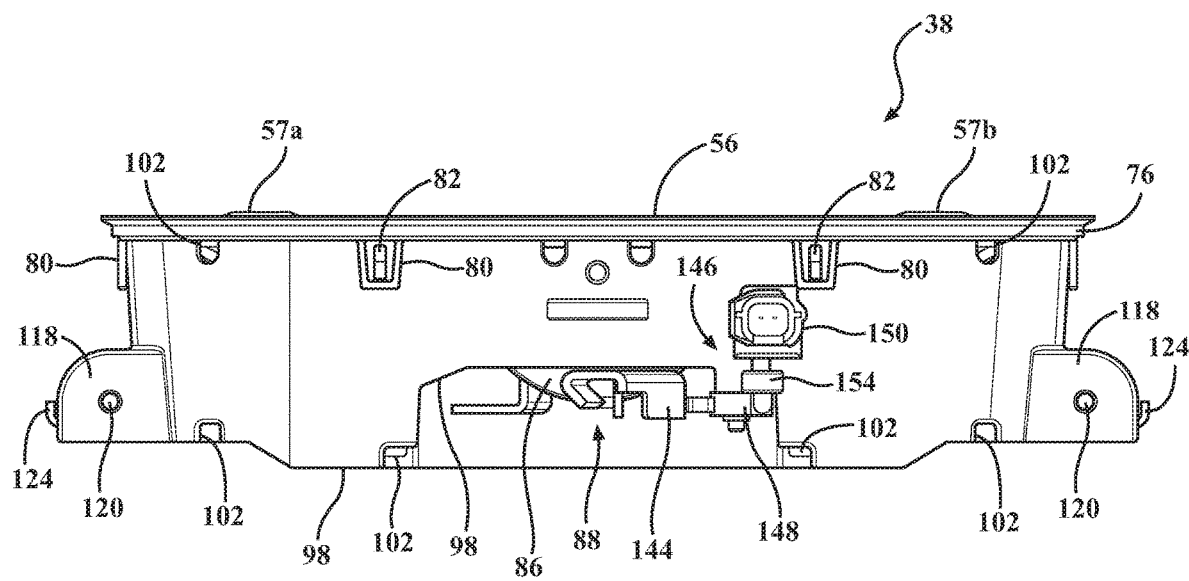
FIG. 7 is a bottom plan view illustrating the assembled flush mounted handle as shown in FIG. 3.

The various features of the handle assembly 38 can further be appreciated with a review of additional drawing views. In this regard, FIG. 6 is a front plan view illustrating the flush mounted handle assembly 38 as shown in FIG. 3 in an assembled state; FIG. 7 is a bottom plan view of the assembly 38; and FIG. 8 is a side plan view of the assembly 38.

Figure 9:
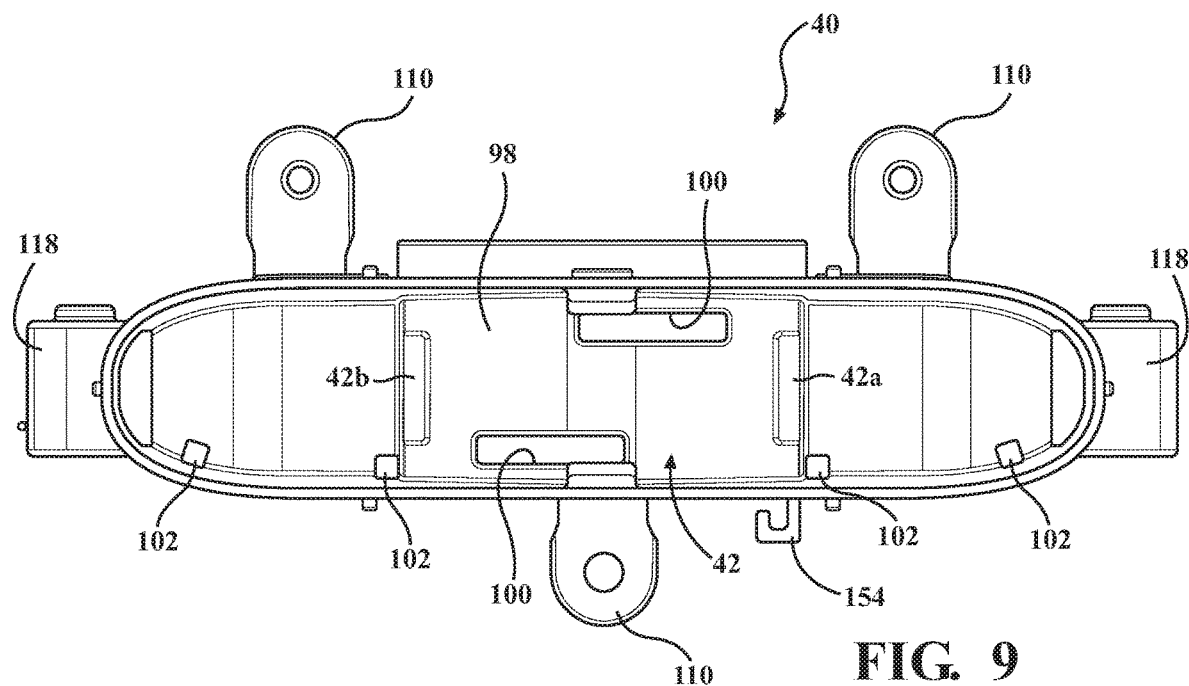
FIG. 9 is a front plan view of an exemplary case defining various access and drain holes, as well as other features such as stop means.

FIG. 9 is a front plan view of an exemplary case 40 defining an internal cavity 42 and having various openings and access areas, such as respective apertures 100 in the rear wall 98 through which the drive arms 84, 86 pass through to engage the bell crank 88, as well as drain holes 102. It should be understood that the overall design of the case 40 is exemplary in nature, and various changes to the case 40 may be made.

Figure 10:
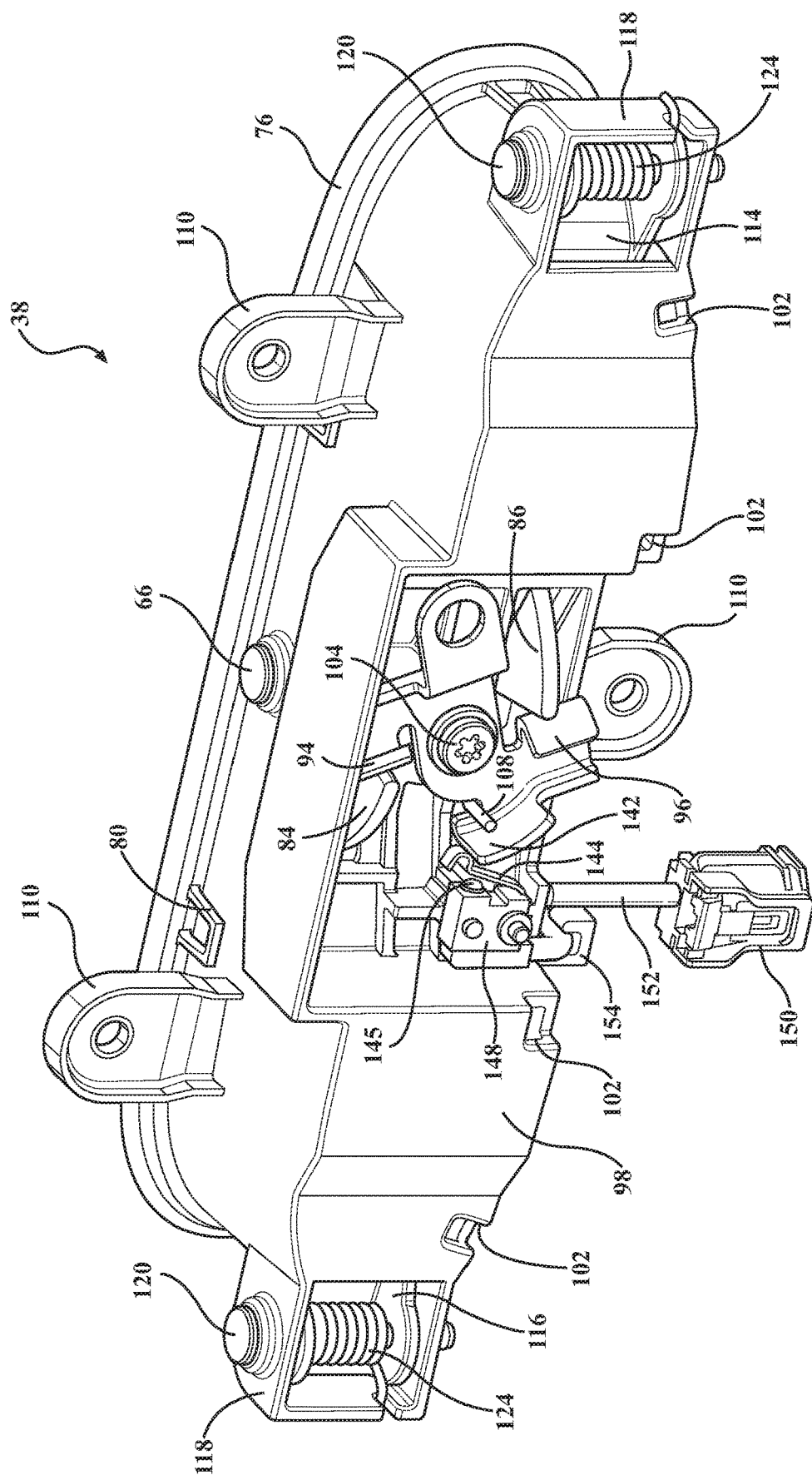
FIG. 10 is a rear perspective view of the assembled flush mounted handle as shown in FIG. 3.
Figure 11:
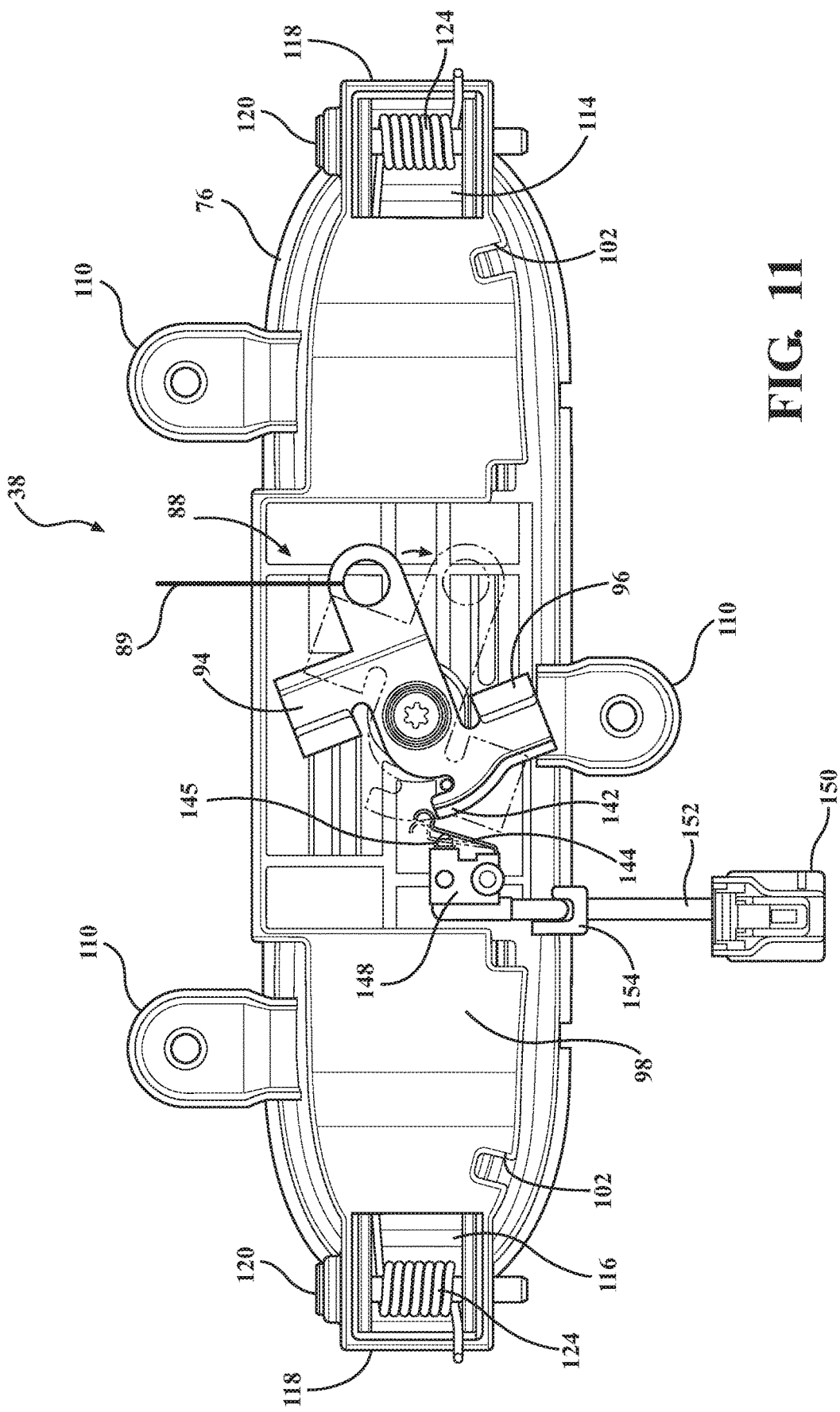
FIG. 11 is a rear plan view of the assembled flush mounted handle illustrating movement of a bell crank and a switch assembly between a first position (solid lines) and a second position (dashed lines)

FIG. 10 is a rear perspective view and FIG. 11 is a rear plan view of the assembled flush mounted handle assembly as shown in FIG. 3, both of which provide additional details of the operation of the bell crank 88 and the switch sub-assembly 146. As described above, initially depressing either side 46, 48 of the handle base 44 will cause a pivoting movement of the handle base 44, which, in turn, causes one of the drive arms 84, 86 to make contact with a respective lever arm 94, 96. For example, upon depressing the right side end 48, the upper drive arm 84 contacts the upper lever arm 94, and upon depressing the left side end 46, the lower drive arm 86 contacts the lower lever arm 96. No matter which drive arm 84, 86 engages its respective lever arm 94, 96, the bell crank 88 will rotatably move in the same direction (specifically clockwise when viewed in FIGS. 10-11). FIG. 11 illustrates the bell crank 88 and an internal lever 144 in both the rest position (solid lines) and during the fully depressed position (dashed lines). As can be seen, the clockwise rotation of the bell crank 88 rotates a trigger portion 142 of the bell crank 88 to stroke the internal lever 144 that, in turn, activates a mechanical actuator 145, such as a biased button, of a body portion 148 of the switch sub-assembly 146 for the power slide door to open or close. The clockwise rotation further moves a release cable 89, which may be coupled to a release mechanism. As shown, the internal lever 144 may be hinged or similarly connected to the body portion 148, and include a curved portion or hook at its distal end that ultimately makes contact with the trigger portion 142 in order to send an appropriate signal requesting operation of the power slide door. In one exemplary design, the body portion 148 that houses the mechanical actuator 145 is in electrical contact with a plug-style harness or connector 150 via a suitable wire 152. The wire may be routed using coupling members 154 disposed on the case 40. The switch sub-assembly 146 may be in communication with various logic controllers, processer components, modules, or the like, in order to control the powered operational mode of the slide door, as will be discussed in more detail below.

FIG. 12 is a top plan view illustrating an exemplary handle base and bell crank in a centered/resting, or neutral state. FIG. 13 is a rear plan view illustrating the exemplary handle base and bell crank in the centered/resting, or neutral state, as shown in FIG. 12. As shown, the lever arms 94, 96 of the bell crank 88 are resting in contact with edges of the respective drive arms 84, 86 extending in a perpendicular direction from a rear face 59 of the handle base 44. In this resting state, the exterior surface 56 of the cover 52 is substantially aligned with the exterior panel 37 of the slide door 36. Although not shown in FIGS. 12-13, but with reference to FIG. 3, when the handle base 44 is located in this centered position, the extending end portions 130a, 130b of the rear facing side of the handle base 44 may be separated a short distance (2 mm-3 mm) from the forward facing engagement surfaces 126 of the paddles 114, 116. This may prevent and/or minimize any unintended contact between the components that could potentially lead to a rattling noise, or the like.

FIG. 14 is a top plan view illustrating an exemplary handle base and bell crank in a first and fully depressed, actuated state, analogous to that shown in FIG. 4A. FIG. 15 is a rear plan view illustrating the exemplary handle base and bell crank in the first and fully depressed, actuated state, as shown in FIG. 14. As shown, when one end 48 of the handle base is depressed, the handle base 44 pivots and the edge 92 of the upper drive arm 84 engages an edge of the respective lever arm 94 of the bell crank 88 to initiate a rotational movement. Rotation of the bell crank 88 (in the clockwise direction), in turn, causes the trigger portion 142 of the bell crank to contact the internal lever 144 and mechanical actuator 145. In various aspects, further rotation of the bell crank 88 can continue just until the trigger portion 142 eventually approaches, but does not make contact with, the underside of the drive arm 84. At the same time, the extending end portion 130b of the rear facing side of the handle base 44 will be moved against the forward facing engagement surface 126 of the respective paddle 116, and a portion of the rear face 59 of the handle base 44 will eventually contact a respective stop means 42a, 42b (FIG. 9) provided extending a distance from a rear wall 98 of the case. Additionally, the opposing end 46 of the handle base 44 is pivoted in an outward extended position. In this extended position, the opposing end 46 exposes the respective rear gripping area 62 for a user to grab and pull the door in the manual mode, either opening or closing the door. Once a user releases the gripping area 62 of the door handle, the handle base 44 and the bell crank 88 may then be automatically biased back to a centered, or rest position, as shown in FIGS. 12-13.

FIG. 16 is a top plan view illustrating an exemplary handle base and bell crank in a second and fully depressed, actuated state, analogous to that shown in FIG. 4B. FIG. 17 is a rear plan view illustrating the exemplary handle base and bell crank in the second and fully depressed actuated state, as shown in FIG. 16. In the reverse arrangement of FIGS. 14-15, when the other end 46 of the handle base is depressed, the handle base 44 pivots and the edge 92 of the lower drive arm 86 engages an edge of the respective lever arm 96 of the bell crank 88 to initiate a rotational movement. Rotation of the bell crank 88 (again, in the same clockwise direction), in turn, causes the trigger portion 142 of the bell crank to contact the internal lever 144 and mechanical actuator 145. In various aspects, further rotation of the bell crank 88 can continue just until the trigger portion 142 eventually approaches, but does not make contact with, the underside of the upper drive arm 84. At the same time, the extending end portion 130a of the rear facing side of the handle base 44 will be moved against the forward facing engagement surface 126 of the respective paddle 114, and a portion of the rear face 59 of the handle base 44 will eventually contact a respective stop means 42a, 42b (FIG. 9) provided extending a distance from a rear wall 98 of the case. Additionally, the opposing end 48 of the handle base 44 is pivoted in an outward extended position. In this extended position, the opposing end 48 exposes the respective rear gripping area 64 for a user to grab and pull the door in the manual mode, either opening or closing the door. Once a user releases the gripping area 64 of the door handle, the handle base 44 and the bell crank 88 may then be automatically biased back to a centered, or rest position, as shown in FIGS. 12-13.

In still other aspects, the present disclosure provides various methods for operating a handle assembly 38 of a power slide door 36 of a vehicle 30. The methods may begin by a user depressing a first end 46, 48 of a pivoting handle 44 inward a first distance into the handle assembly 38, thereby causing a respective drive arm 84, 86 extending from the handle 44 to rotate a bell crank 88. As discussed above, upon rotation of the bell crank 88, an arm 94, 96 of the bell crank may, in turn, actuate a switch sub-assembly 146 configured to automatically engage either an opening or closing movement of the power slide door 36. The method may include releasing the end 46, 48 of the handle, and permitting the bell crank 88 and the handle base 44 to automatically return to a biased centered position. In such a position, an exterior portion 56 of the handle assembly 38 may be flush with an exterior panel 37 of the power slide door 36. The method may additionally include determining a source of power from a power supply has been interrupted, where actuating the switch sub-assembly does not automatically engage either an opening or closing movement of a power slide door 36. The method may then include further depressing the end 46, 48 of the pivoting handle a second distance into the handle assembly 38, to cause additional rotation of the bell crank 88 and to both (1) release a lock mechanism and (2) cause a second, opposite end of the pivoting handle to outwardly extend a further distance from the door. The method may include gripping the outwardly extending second end of the handle 44 to manually move the power slide door 36 to a desired open or closed position.

Figure 18:
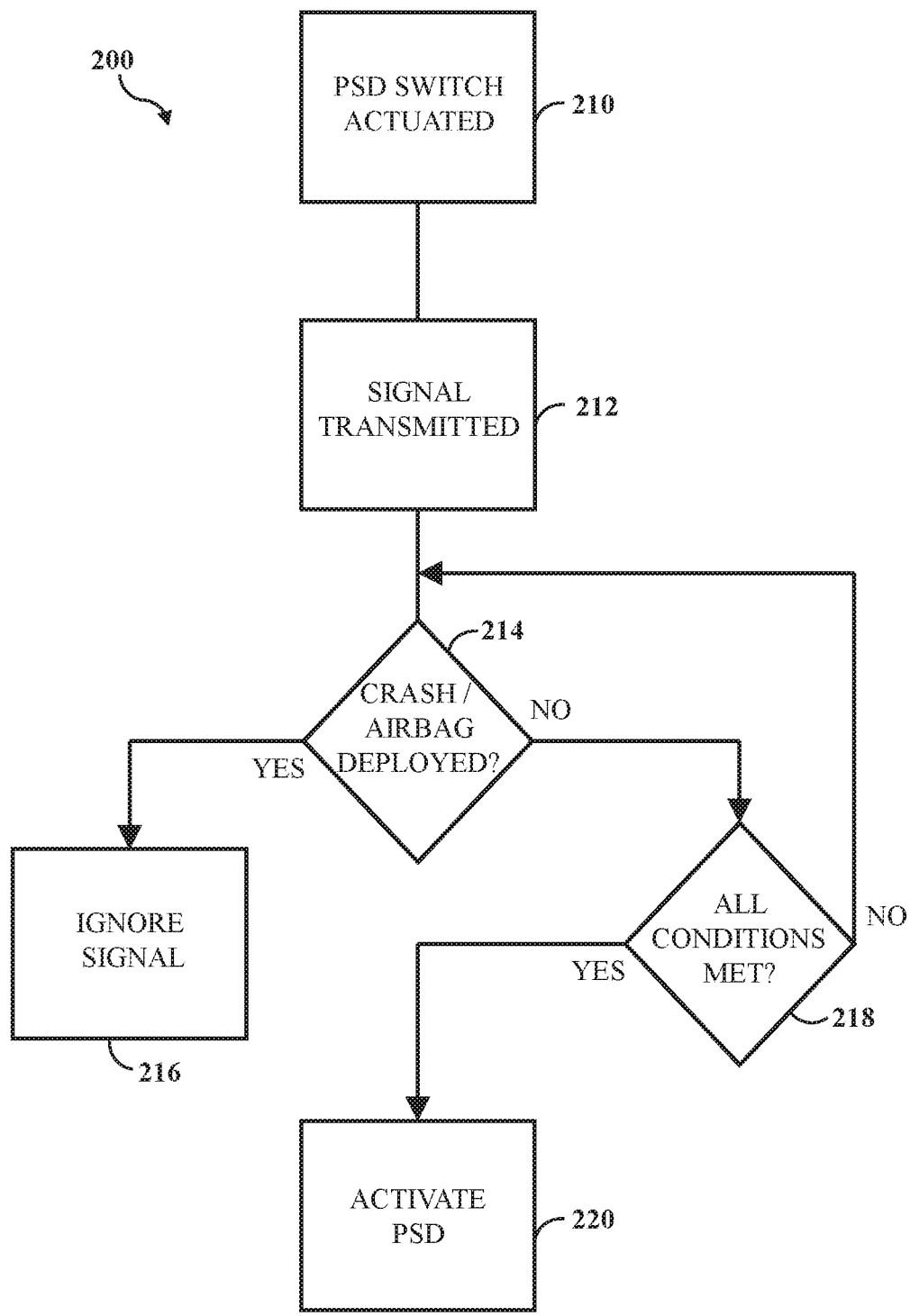
FIG. 18 is a first diagram view of an exemplary logic control with respect to verifying certain conditions prior to allowing operations of the power slide door.

The present technology also provides systems and methods focused on safety considerations for the operation of a power slide door flush-mounted handle assembly 38. As mentioned above, with a one-touch, or push button type actuation, certain safety considerations should be considered to ensure that the actuation is intentional. For example, if a vehicle is involved in a collision, or is struck by a barrier or other object, the one-touch actuation mechanism should not be able to be inadvertently triggered. Accordingly, the present technology is concerned with providing safety mechanisms to prevent, or at least minimize, such unwanted or unintentional activation of the power slide door. In this regard, FIG. 18 illustrates a first diagram view of an exemplary logic control with respect to verifying certain conditions are met prior to allowing operations of the power slide door.

In one non-limiting method, represented by reference number 200, the logic control begins with the power slide door switch sub-assembly 146 being actuated, for example, by the rotation of the bell crank 88 causing a trigger portion 142 to contact the internal lever 144 and mechanical actuator 145, as represented by method box 210. The methods may include transmitting a signal to request an opening or closing operation of the power slide door, as represented by method box 212. This signal may thereafter be received at one or more control systems of the vehicle.

The control system(s), or portions thereof, may be located within the vehicle, or otherwise made available to the vehicle through a suitable network or through the use of other vehicle systems. The control system(s) may include one or more controller, processor, receiver, transmitter, actuation units, programming units, memory storage, communication units, sub-control units etc., operatively coupled together in a suitable manner, with wired or wireless configurations. In one example, the control system may include an electronic control unit (ECU), or equivalent, preferably located within the vehicle. In some embodiments, the control system may be associated with a user interface, enabling operators to control at least a portion of the system, or to otherwise interact with the system. In certain aspects, the interface may allow a user to enable or disable certain features of the present technology. Further, a user may be able to define or modify certain conditions of the operation of the present technology.

The methods of the present technology preferably include determining that the signal was not transmitted as a result of a vehicle impact, or the like. As referenced by method box 214, this may include at least some type of a vehicle system check, confirming that no airbag or crash sensors (or the like) have been triggered that would indicate a vehicle collision or some type of vehicle impact. Various other sensors, such as G-force or accelerometer sensors, cabin pressure sensors, glass/window breaking sensors, or the like may also be useful with the present technology. Only after such a determination do the methods ultimately proceed to include a triggering operation of the power slide door. For example, as shown by method box 216, if there is any determination that the vehicle may have been involved in an impact or collision, or any other reason to justify that the signal may not have been intentionally sent, the control system, such as the ECU, will ignore the signal and no automatic operations of the power slide door will occur. In various aspects, the methods may include providing at least one of an audible or visual notification to a user to indicate that operation of the power slide door has been deactivated as a result of a vehicle impact or airbag deployment.

If after receiving the signal, the ECU determines that there is no indication that the vehicle has been involved in an impact or collision, the methods may optionally proceed to an additional step of confirming that all other conditions for operating the power slide door have been met, as indicated by method box 218. In one example, the determination that the signal was not transmitted as a result of a vehicle impact, or the like, includes checking the status of various airbag and/or crash sensors, and continuing to verify that no airbag has been deployed (or no other sensor triggered, or had a status change) for a predetermined time after the ECU originally receives the signal. In certain aspects, the predetermined time period can be greater than about 0.5 seconds, or greater than about 0.8 seconds, or greater than about 1.0 seconds, or greater than about 1.5 seconds.

In addition to the continuous monitoring of sensors for a predetermined time period, other conditions precedent that may useful with the present technology may include verifying the vehicle is: not in motion, not in certain drive gears, operating less than a certain speed, or has a certain yaw rate. Further considerations may include whether there is brake pressure applied, the status of seat belt use and seat belt locks, seat occupant information, door lock status, and the like. Once it is determined that the vehicle has not been in an impact or collision, and any other required conditions are met, the control system or ECU may proceed to activate the power slide door as referenced in method box 220.

Figure 19:
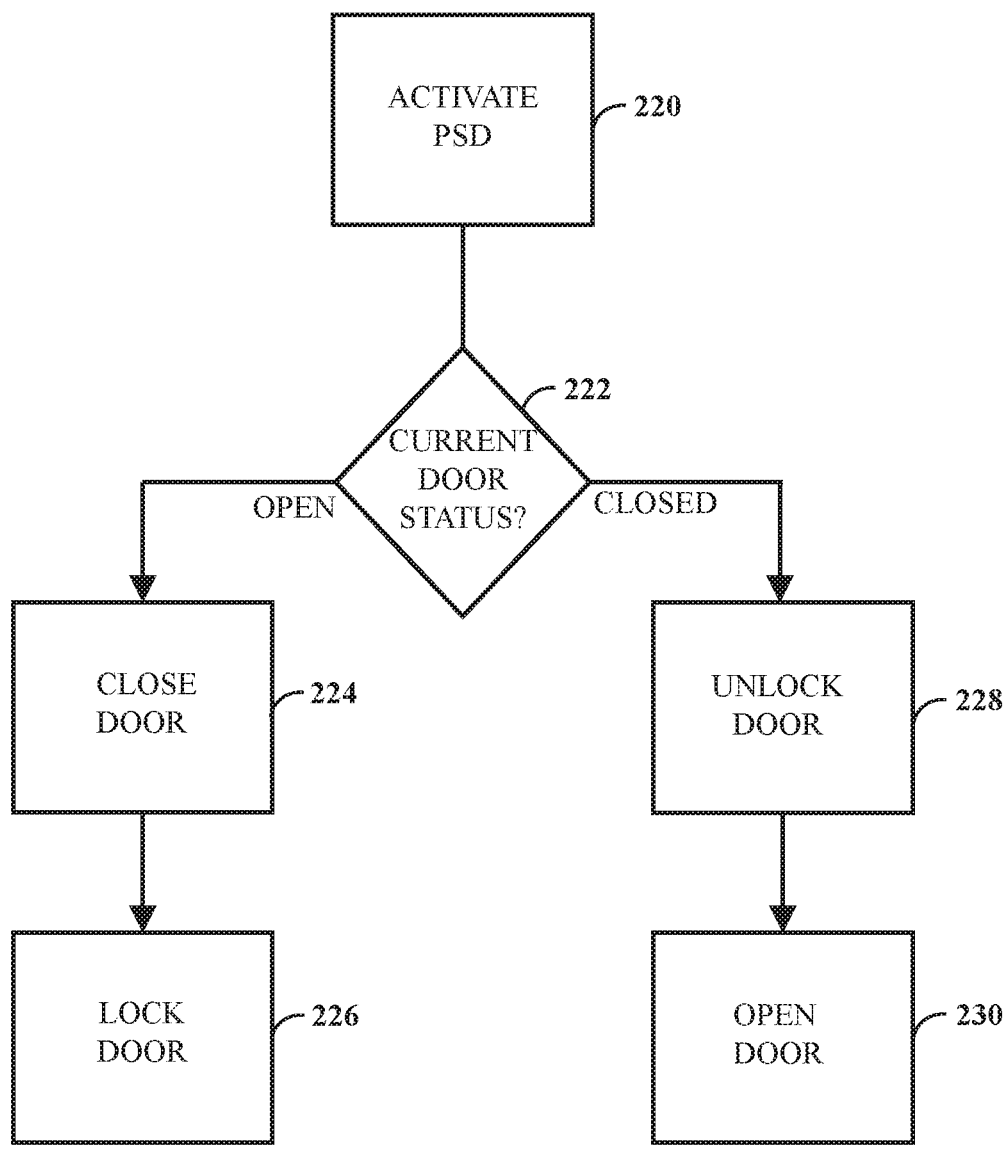
FIG. 19 is a second diagram view illustrating further details of the logic control shown in FIG. 18.

FIG. 19 is a second diagram view illustrating further details of the logic control shown in FIG. 18, and in particular, provides further details of the activation of the power slide door 220. For example, as shown by method box 222, the methods may further include determining the current operational state of the power slide door. If the power slide door is in an open position, the ECU may proceed to take the necessary steps to close the door, as represented by method box 224, and optionally lock the door, as represented by method box 226. Alternatively, if the power slide door is in a closed position, the ECU may proceed to take the necessary steps to unlock the door (when necessary), as represented by method box 228, and then open the door, as represented by method box 230.

The foregoing description is provided for purposes of illustration and description and is in no way intended to limit the disclosure, its application, or uses. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

As used herein, the term "vehicle" should be construed having a broad meaning, and should include all types of vehicles, with non-limiting examples including a passenger car, truck, motorcycle, off-road vehicle, bus, boat, airplane, helicopter, lawn mower, recreational vehicle, amusement park vehicle, farm vehicle, construction vehicle, tram, golf cart, train, or trolley, etc. The vehicles may be self-driving, for example, having an autonomous mode, and/or be manually operated.

As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range, including the endpoints.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

What is claimed is:

1. A method for operating a flush mounted handle assembly for a power slide door of a vehicle, the method comprising:
    permitting a first end of a pivoting handle to be depressed inward a first distance into the flush mounted handle assembly, thereby causing a drive arm extending from the pivoting handle to rotate a bell crank;
    upon rotation of the bell crank, actuating a switch sub-assembly configured to transmit a signal to request an opening or closing operation of the power slide door;
    receiving, at an electronic control unit (ECU), the signal;
    determining, at the ECU, that the signal was not transmitted as a result of a vehicle impact;
    activating operation of the power slide door.

2. The method according to claim 1, wherein the step of determining, at the ECU, that the signal was not transmitted as a result of a vehicle impact comprises determining that no vehicle airbag has been deployed.

3. The method according to claim 2, further comprising determining that all required conditions for operation of the power slide door have been met.

4. The method according to claim 3, comprising repeating the determination, at the ECU, that no vehicle airbag has been deployed for a predetermined time period after receiving the signal.

5. The method according to claim 4, wherein the predetermined time period is greater than about 0.5 seconds.

6. The method according to claim 4, wherein the predetermined time period is greater than about 0.8 seconds.

7. The method according to claim 4, wherein the predetermined time period is greater than about 1 second.

8. The method according to claim 3, comprising determining, at the ECU, that the vehicle is not in motion prior to activating the operation of the power slide door.

9. The method according to claim 1, wherein the step of activating the operation of the power slide door comprises determining, at the ECU, a current operational state of the power slide door.

10. The method according to claim 9, comprising:
    determining that the current operational state of the power slide door is an open position;
    closing the power slide door; and
    locking the power slide door.

11. The method according to claim 9, comprising:
    determining that the current operational state of the power slide door is a closed position;
    unlocking the power slide door; and
    opening the power slide door.

12. The method according to claim 1, further comprising releasing the first end of the handle and permitting the bell crank and the handle base to automatically return to a biased centered position, such that an exterior surface of the pivoting handle is substantially flush with an exterior surface of the power slide door.

13. The method according to claim 1, wherein actuating the switch sub-assembly comprises initiating, by rotation of the bell crank, a stroke of an internal lever to trigger a mechanical actuator of the switch subassembly and transmit the signal to the ECU.

14. The method according to claim 1, further comprising providing at least one of an audible or visual notification to a user to indicate that operation of the power slide door has been deactivated as a result of a vehicle impact.

15. A method for preventing an unintended activation of a flush mounted handle assembly for a power slide door of a vehicle, the method comprising:
    providing the flush mounted handle assembly with a handle base pivotally coupled to a case fixed in a recess of the power slide door;
    permitting a first end of the pivotally coupled handle base to be depressed inward a first distance into the flush mounted handle assembly, thereby causing a drive arm extending from the handle base to rotate a bell crank;
    upon rotation of the bell crank, actuating a switch sub-assembly configured to transmit a signal to request an opening or closing operation of the power slide door;
    receiving, at an electronic control unit (ECU), the signal;
    determining, at the ECU, that the signal was not transmitted as a result of a vehicle impact;
    activating operation of the power slide door after a predetermined period of time has elapsed without the ECU receiving any indication that a vehicle airbag has been deployed.

16. The method according to claim 15, wherein the predetermined time is greater than about 0.8 seconds.

17. A system for preventing an unintended activation of a flush mounted handle assembly for a power slide door of a vehicle, the system comprising:
    the flush mounted handle assembly, comprising:
    a case configured to be fixed in a recess of the power slide door of the vehicle;
    a handle base pivotally coupled to the case, the handle base having a first end and a second opposing end, the first and seconds ends being configured for a selective pivotal movement in opposite directions about a fixed pivot axis with respect to a resting plane; and
    a bell crank coupled to the case and configured to rotate upon engagement with the handle base in order to actuate a switch assembly and to transmit a signal to initiate powered operation the power slide door;
    at least one airbag sensor or cabin pressure sensor configured to detect deployment of an airbag or vehicle impact; and
    an electronic control unit (ECU) programmed to receive the signal transmitted by the switch assembly and control operations of the power slide door, the ECU further being programmed to determine that the signal was not transmitted as a result of a vehicle impact prior to operating the power slide door.

18. The system according to claim 17, wherein the ECU is programmed to determine that no vehicle airbag has been deployed as a required condition before operating the power slide door.

19. The system according to claim 18, wherein the ECU is programmed to repeatedly determine that no vehicle airbag has been deployed for a predetermined time period after receiving the signal.

20. The system according to claim 19, wherein the predetermined time period is greater than about 0.8 seconds.

* * * * *